United States Patent [19]
Duran et al.

[11] Patent Number: 6,126,817
[45] Date of Patent: Oct. 3, 2000

[54] OIL AND DEBRIS SEPARATOR

[75] Inventors: Lee A Duran, Lyme, Conn.; Thomas J. Mullen, III, Wyncote, Pa.

[73] Assignee: Best Management Products, Inc., Lyme, Conn.

[21] Appl. No.: 09/346,181

[22] Filed: Jul. 1, 1999

Related U.S. Application Data
[60] Provisional application No. 60/103,174, Oct. 6, 1998.

[51] Int. Cl.[7] .................................................. B01D 21/30
[52] U.S. Cl. ......................... 210/123; 210/154; 210/120; 210/532.1; 210/539; 404/4
[58] Field of Search .............................. 210/97, 109, 120, 210/153, 154, 163, 164, 170, 188, 532.1, 538, 539, 540, 121, 123; 137/123, 152, 215–217; 404/2, 4

[56] References Cited

U.S. PATENT DOCUMENTS

| | | | |
|---|---|---|---|
| 2,102,429 | 12/1937 | McLeod | 210/539 |
| 2,102,430 | 12/1937 | McLeod | 210/539 |
| 2,576,645 | 11/1951 | Shenk | 210/539 |
| 2,852,140 | 9/1958 | MacLaren . | |
| 3,804,252 | 4/1974 | Rishel | 210/84 |
| 3,904,524 | 9/1975 | Pelton et al. | 210/94 |
| 4,333,835 | 6/1982 | Lynch | 210/305 |
| 4,684,467 | 8/1987 | Cloud | 210/519 |
| 4,832,846 | 5/1989 | Gavin | 210/532.2 |
| 4,985,148 | 1/1991 | Monteith | 210/532.1 |
| 5,101,849 | 4/1992 | Richard | 137/15 |
| 5,204,000 | 4/1993 | Steadman et al. | 210/519 |
| 5,433,845 | 7/1995 | Greene et al. | 210/710 |
| 5,505,860 | 4/1996 | Sager | 210/519 |
| 5,560,826 | 10/1996 | Szereday et al. | 210/522 |
| 5,569,372 | 10/1996 | Smith | 210/532.1 |
| 5,618,445 | 4/1997 | Gavin | 210/800 |
| 5,725,760 | 3/1998 | Monteith | 210/538 |
| 5,849,181 | 12/1998 | Monteith | 210/538 |
| 5,895,569 | 4/1999 | Connelly | 210/170 |

*Primary Examiner*—Joseph W. Drodge
*Attorney, Agent, or Firm*—St. Onge Steward Johnston & Reens LLC

[57] ABSTRACT

A system for separating and retaining liquid with different specific gravities and floatables includes a hood made of plastic and mounted to cover an outlet pipe of a basin receiving the liquid. The hood is formed with a housing dividing the basin into an inlet chamber and outlet chamber and preventing supernatant liquids with a lower specific gravity, floatables accumulated on the surface of a liquid with a higher specific gravity and solids accumulated in the basin from being drawn downstream into the outlet pipe. The hood is further provided with a device equalizing air pressure between the inlet and outlet compartments. A flow restrictor is incorporated in one embodiment to regulate the discharge of liquid from the basin.

20 Claims, 6 Drawing Sheets

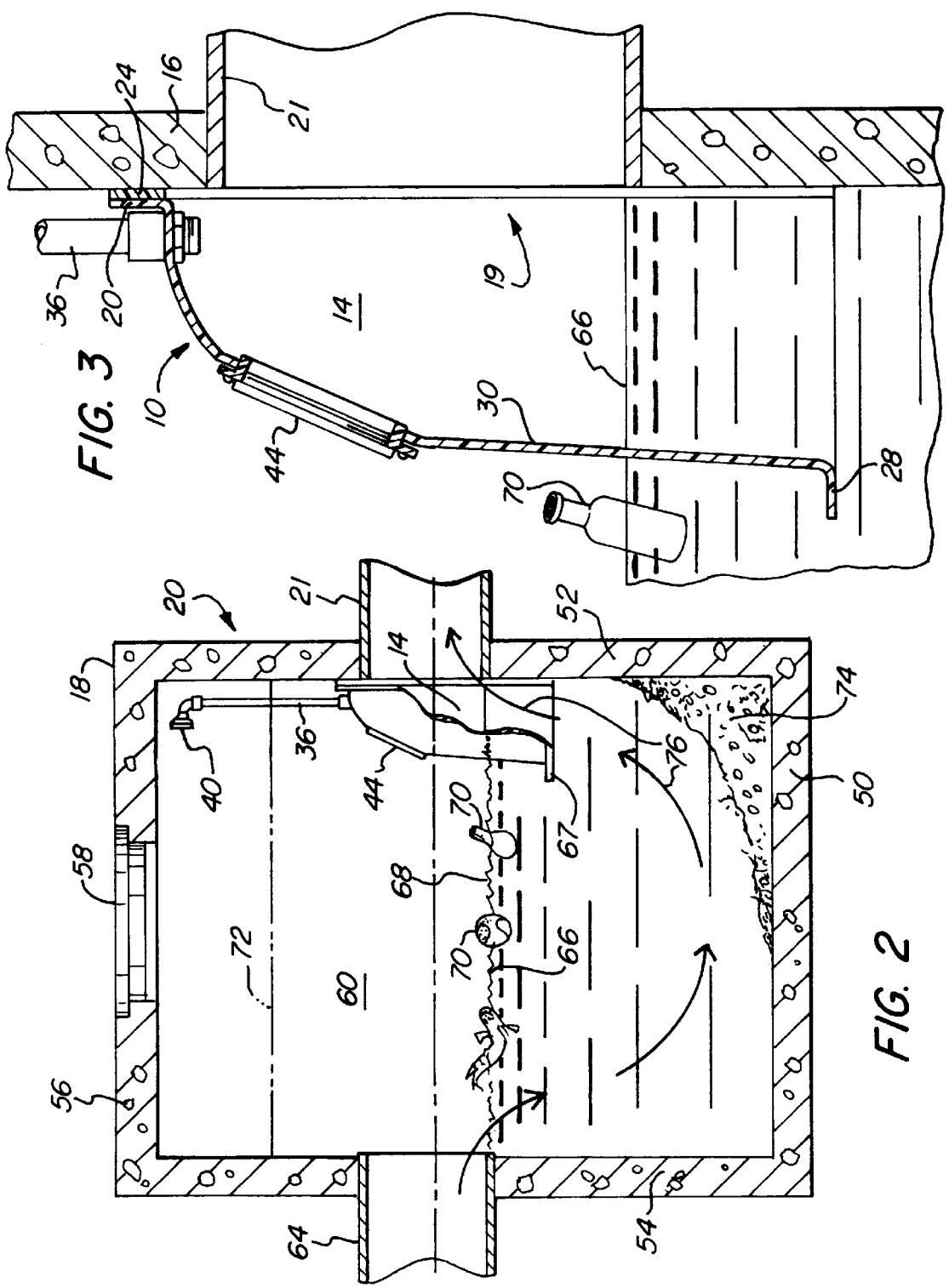

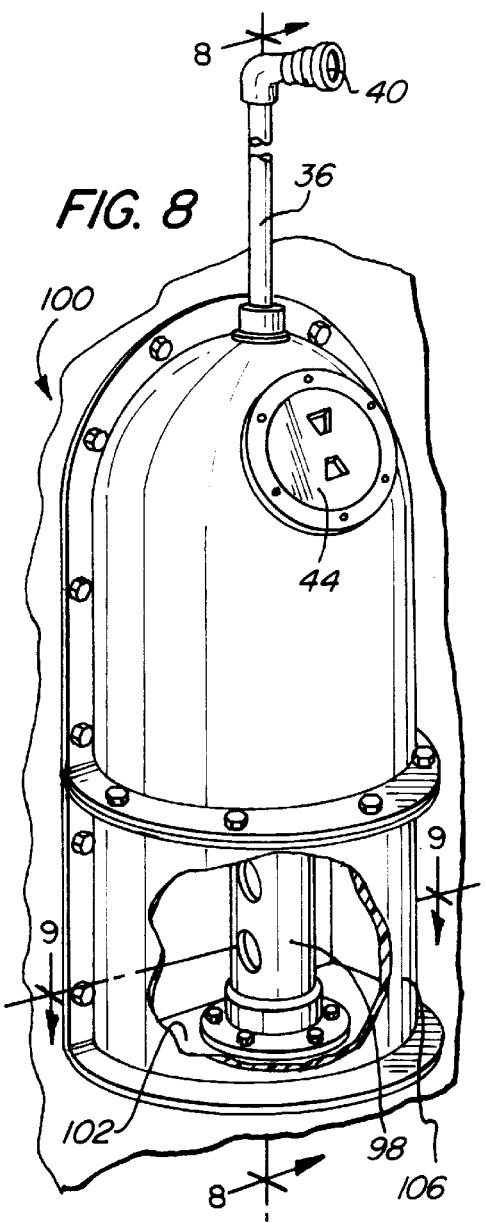
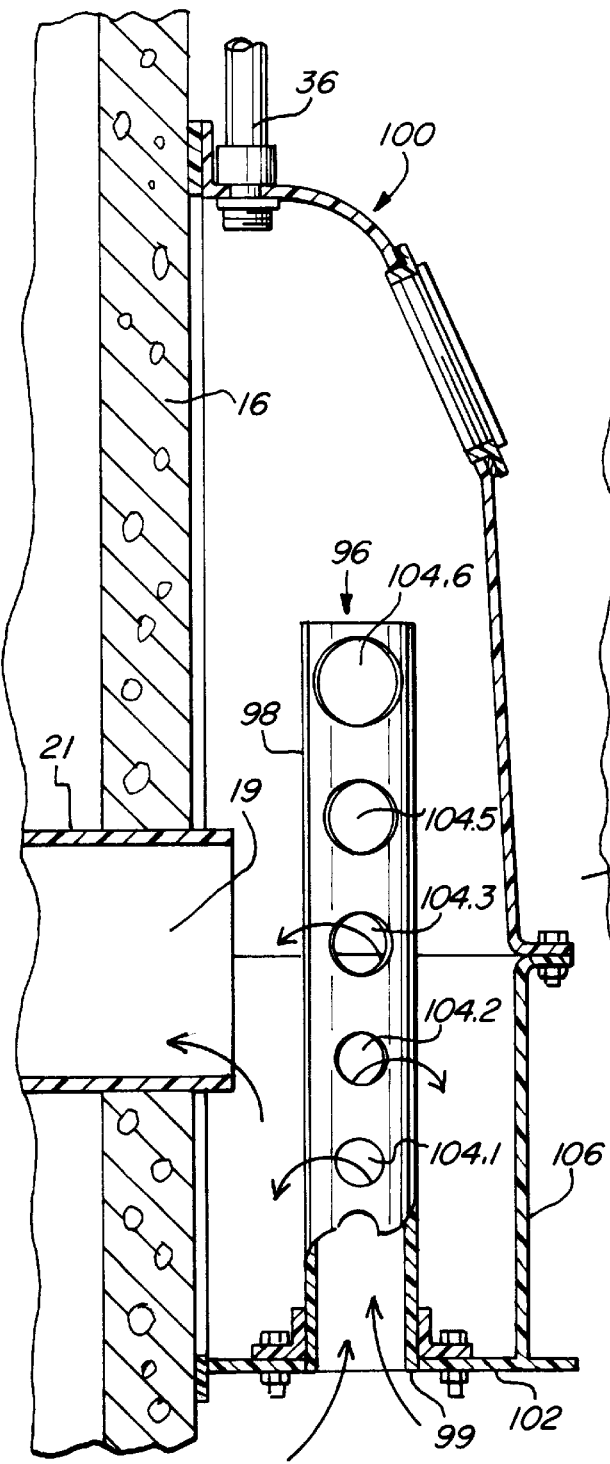
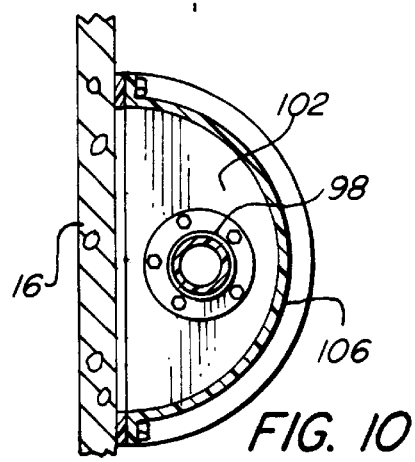
FIG. 8
FIG. 9
FIG. 10

OIL AND DEBRIS SEPARATOR

This application claims the priority benefits under Title 35, United States Code, §119(e) of the U.S. Provisional Application No. 60/103,174 filed on Oct. 6, 1998.

FIELD OF THE INVENTION

The present invention relates to a low cost and effective device for improving the quality of waste water such as storm water discharged from a catch basin. More particularly, the invention relates to a trap which is installed in a below ground liquid and other material-separating structure with a sump such as catch basins, storm drains or the like and which traps floatable debris and liquids of specific gravities that are different from that of water.

BACKGROUND OF THE INVENTION

It is a common occurrence to see an unsightly oil slick or trash floating in a roadside stream. The EPA has identified improvement of the quality of water discharges as a priority. The Clean Water Act mandates action for many communities. Several reports have recommended the use of hoods to cover outlet pipes in liquid-separating structures to improve storm water discharge quality. A report surveying environmental practices of seventy eight communities bordering the Long Island Sound (Natural Resources Defense Council 1998), specifically recommends using hoods to screen out floatable debris. Few communities currently follow this recommendation. The need for the separation of mixtures of liquids with different specific gravities is frequently encountered not only in such urban environments but also in various industries where oil spills occur. Conventional drainage systems control the surface area on which oil and debris fall by enabling these impurities to be collected in a liquid-separating system which is, at least partially submerged in the ground.

Many types of equipment and processes have been suggested in the past for separating liquid mixtures. Most of these methods have been based on the principle of differential specific gravity separation. The liquid mixture, which usually is waste water, flows slowly through an elongated path in a liquid-retaining structure, such as, for example, a basin. The matter to be collected is usually oil and floatable debris, both of which accumulate on the surface of the wastewater. As the wastewater passes through the basin solids carried by the wastewater accumulate on a bottom of the basin. These solids include solid debris with specific gravity greater than the wastewater's specific gravity and are too large to be suspended in the wastewater and very fine particles which are suspended in the wastewater but tend to settle to a bottom given time or a slowdown of liquid flow in the basin.

U.S. Pat. No. 5,505,860 discloses a rather typical structure of a separator wherein separation is promoted by a planar baffle plate extending across an interior of a trap body. The baffle plate retains grease on an upstream side permitting flow under the planar baffle plate to a downstream side. An outlet fitting extends upward from below to permit filtered water to exit from the trap body.

U.S. Pat. No. 4,832,846 discloses a septic tank baffle for mounting over an outlet port in a septic basin. The baffle includes a conduit terminating below the liquid level and an angled flap directing flow into the conduit from below the baffle. The conduit is provided with an open back side for mounting toward a basin wall so that there are top and bottom open ends with a front side of the baffle being formed with a plurality of walls which are joined together to form a trough.

U.S. Pat. Nos. 3,904,524, 5,505,860, 5,433,845 disclose different variations of baffle plates designed to improve separation of a liquid mixture.

However, a disadvantage of the devices disclosed in these latter patents is a complicated structure including a plurality of separating partitions. As a consequence, maintenance of submerged liquid-separating systems is, in general, more difficult.

SUMMARY OF THE INVENTION

With a waste water separating system in accordance with the invention one can effectively filter waste water accumulated in a catch basin by retaining liquids having lower specific gravities than water in a collection structure by using a separating structure that is relatively easy to install into an existing catch basin while enabling maintenance of the outlet pipe through which filtered water is discharged.

This is achieved with one waste water separating system according to the invention by having a hood made of a light durable material and which can be mounted to a wall of a collection structure such as a catch basin. The hood preferably is made of a durable material which is impervious to corrosive components contained in the wastewater mixture entering the collection structure. The hood has a peripheral wall, which is shaped to define a compartment, when the hood is mounted to the wall of the collection structure. An anti-siphon vent mounted to the hood extends upwardly therefrom to vent air from inside the compartment to ambient air. With this wastewater separating device, filtered water can enter the outlet of the collection structure while materials such as oil and floatables are retained inside the collection structure.

It is, therefore, an object of the present invention to provide a wastewater separation system for a collection structure such as a catch basin with which the drawbacks of the above-described prior art are overcome.

Still another object of the present invention is to provide a wastewater separation system for catch basins, which is easily installed and enables access for maintenance.

Yet another object of the present invention is to provide a wastewater separation system which has a relatively light structure.

Another object of the present invention is to provide a wastewater separation system, which can be easily utilized with existing collection structures such as catch basins, storm drain or the like.

Another object of the present invention is to provide a means for equalizing air pressure between a catch basin and its outlet pipe.

Still another object of the present invention is to provide a convenient discharge path for gases, which accumulate in the outlet pipe or downstream subterranean structures in fluid flow communication with a catch basin.

Still another object of the invention is to provide a liquid and floating debris waste water separation system, which discharges filtered water in a controlled manner in a storm drain system to minimize flooding.

The invention also contemplates a wastewater separating system wherein the hood is an integral part of a collection basin and wherein the hood forms a housing having an inlet and an outlet from which liquid separated from the wastewater mixture is discharged. The hood is sealably mounted to the basin wall around its outlet and extends downwardly below it to prevent materials such oil and floatable debris from being drawn downstream into the outlet. An anti-siphon vent extends up from the hood.

The anti-siphon vent is sized to equalize air pressure between the compartment enclosed by the hood and ambient air above the basin. As described herein for one form of the invention the vent can be terminated with a valve or filter to prevent debris from passing through the vent to the outlet.

In order to facilitate maintenance of the outlet covered by the hood a clean-out port is provided on the hood in general alignment with the outlet of the basin. The port is removably attached to the hood to provide access to the outlet and its connected pipe as well as to the compartment inside the hood.

The pollutant-separating device described above can be used as an integral part of a newly manufactured basin for different accumulating structures including catch basins, storm drains and the like.

While the following is shown and considered to be the preferred embodiments of the present invention, it will be obvious to those skilled in the art that various changes and modifications may be made therein without departing from the scope of the invention.

BRIEF DESCRIPTION OF THE DRAWINGS

The above and other objects, features and advantages will become more readily apparent from the following description of the preferred embodiments of the invention, reference is made to the accompanying drawing in which:

FIG. 2 is a sectional partially broken away view of a hood in accordance with the invention mounted in a mixture-separating basin;

FIG. 3 is a side cross-section view of the embodiment shown in FIG. 2;

FIG. 8 is a perspective and partially broken away view of still another embodiment of a hood according to the invention;

FIG. 9 is a partial side cross-sectional view of the device shown in FIG. 8;

FIG. 10 is a bottom end view in partial cross-section of the hood shown in FIG. 4;

SPECIFIC DESCRIPTION OF THE DRAWINGS

Figure 1:
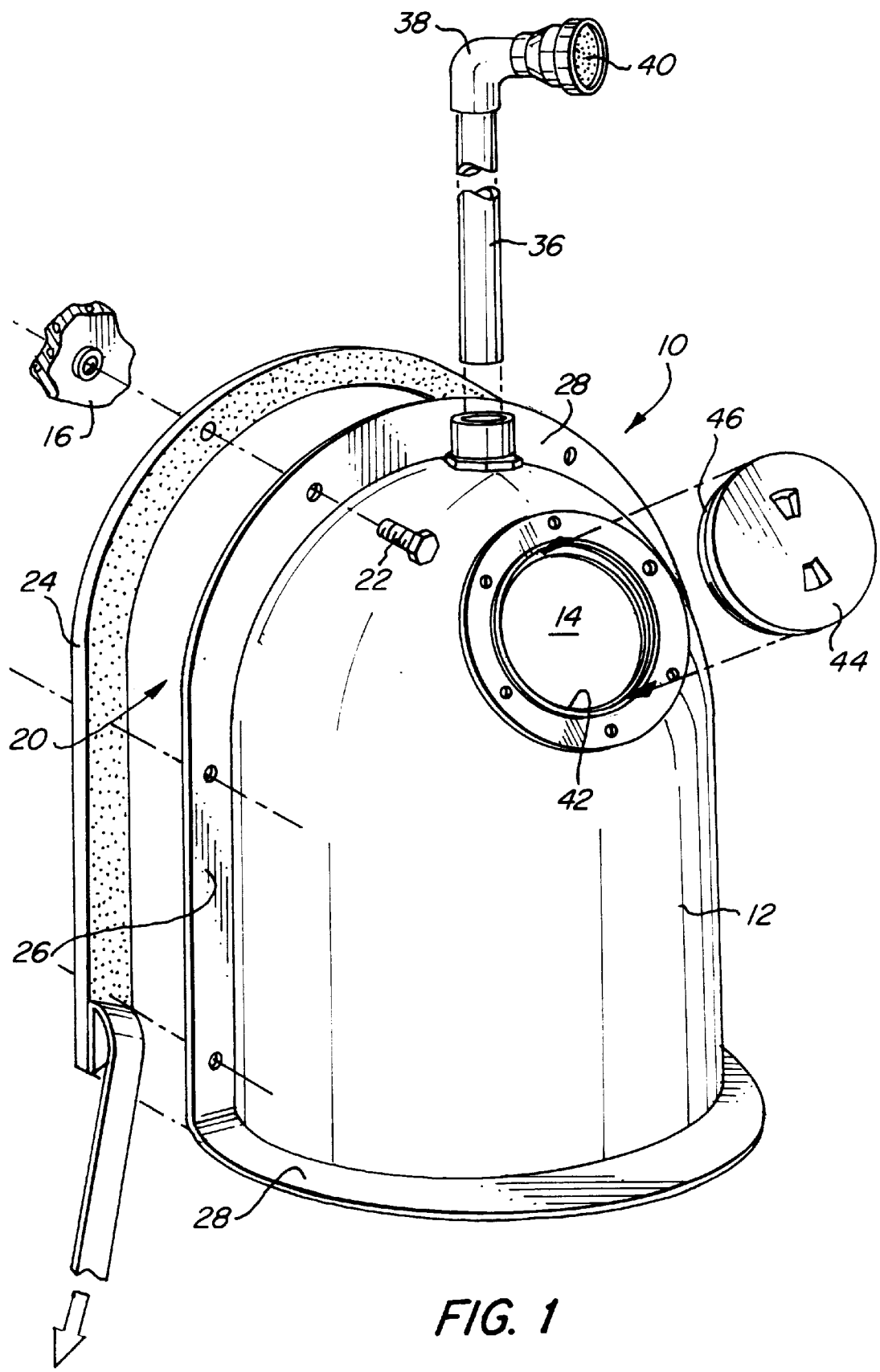
FIG. 1 is a perspective view of a preferred embodiment of a hood according to the present invention.

Although the invention may take many forms, the drawings with reference to FIGS. 1–10 illustrate the adaptation of the invention to a below ground catch basin for separating water from oil and floatable debris.

Referring to FIGS. 1 through 4, a hood 10 is shown having a domed body 12 to form a compartment 14 when the body 12 is affixed to a wall 16 of a waste water collection structure such as a catch basin 18 over an outlet 19 leading to a discharge pipe 21. Body 12 has a mounting flange 20. Flange 20 has side segments 26, 27 shaped to fit flush with wall 16 so that hood 10 can be affixed to the wall with suitable bolts 22 and with a seal 24 to form a sealed compartment 14.

Flange 20 may be in segments or in a continuous shape as shown with side located segments 26, 27 having their lower ends connected by a bottom segment 28 that extends laterally and horizontally from the body 12. The upper ends of side segments 26, 27 join at an apex or upper portion 29. The side segments 26, 27 can be in a vertical flat plane or located along a curved surface that matches the curvature of the surface of the wall 16 of the catch basin 18. Note that flange 20 need not include a bottom segment 28.

Specifically, hood 10, is formed as a one-piece molded housing made of a plastic composite or of fiberglass. However, when the outlet pipe 21 is very large, for example 48" in diameter, hood 10 may become too large and in such case it is more convenient to make hood 10 of multiple mating parts, with the division being along a horizontal plane. The separate parts would be sealed to each other with a suitable seal located between horizontal flanges.

The wall 30 of hood 12 has a dome shape, which has a convex shaped horizontal cross-section whereas its vertical cross section is inclined from the bottom rim 28 towards the flange 20 as illustrated in FIG. 3.

Figure 11:
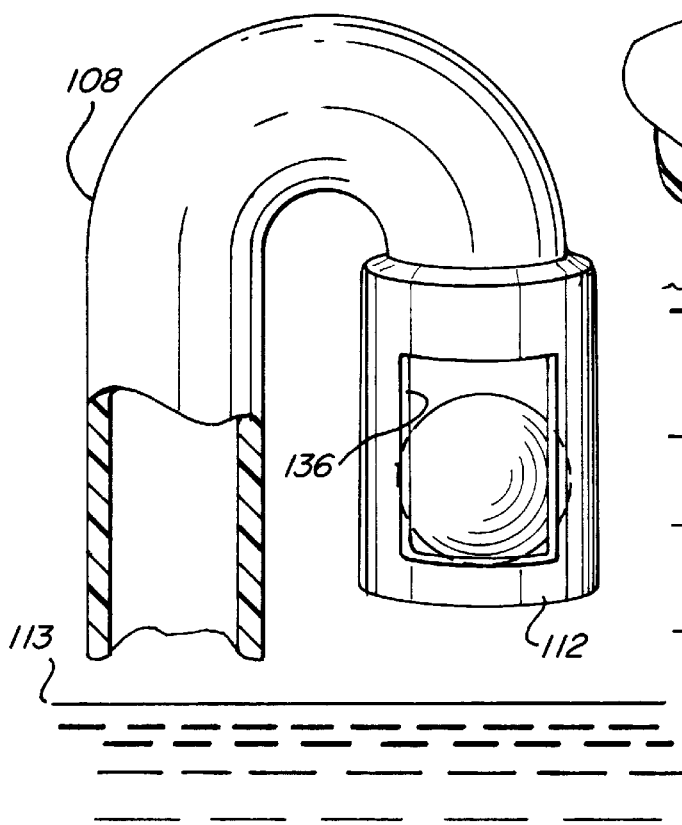
FIG. 11 is a side view in partial cross-section of a pressure equalization vent with a float valve according to the invention.
Figure 12:
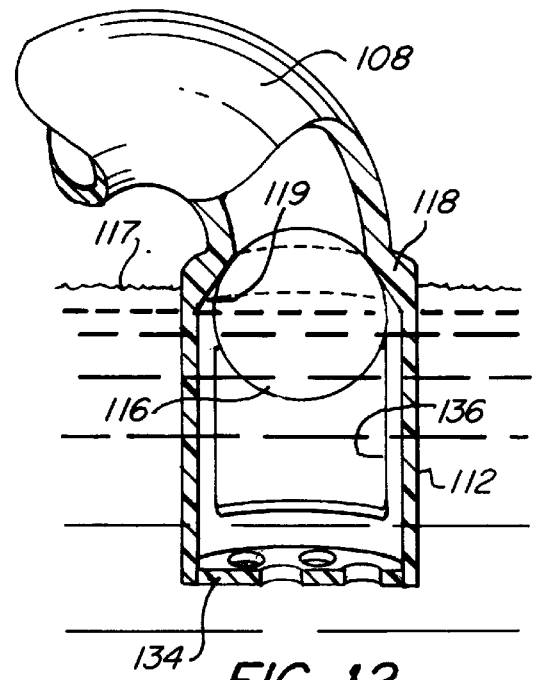
FIG. 12 is the same view in partial cross-section of a different part of the pressure-equalization vent shown in FIG. 11.
Figure 13:
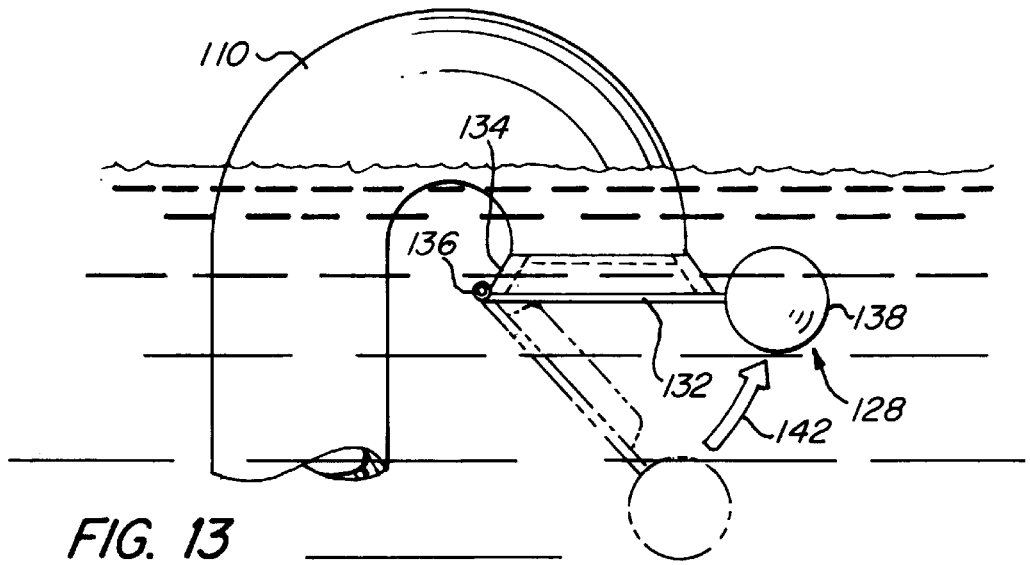
FIG. 13 is a side view of a pressure-equalization vent in accordance with still another embodiment of the invention.

Hood 10 is provided with a pressure-equalization vent 36 for air communication between compartment 14, inside of hood 10, and ambient air after installation of hood 10 to basin 18 as shown in FIG. 2. Vent 36 can be formed of a PVC vent pipe and is mounted to the upper part of wall 30. As shown in FIG. 1, an upper end of vent pipe 36 is provided with a 90° elbow 38. The vent can be open, but preferably is terminated either with a filter 40 to reduce the escape of fumes and odors from the interior of hood or with a flapper valve as shown in FIGS. 11–13. Other fittings adapted to control the flow of air and to prevent the entrance of water can be used. Filter 40 can be a standard NIOSH filter.

The interior of hood 10 is accessed through an access port 42 formed in the wall 30 of hood 10. Port 42 has a lid 44, which uses a peripheral gasket 46 made of a watertight rubber material that seals lid 44 to wall 30 over port 42. Location of port 42 on wall 30 is selected so that access to the outlet pipe 21 can be obtained for cleaning and such other servicing as may be required.

Hood 10 is both securely attached to wall 16 of basin 18 by either stainless screws or bolts 22 and sealed to the wall 16 with marine silicone adhesive or gasket material 24. The gasket 24 can be coated with a pressure-sensitive adhesive and be formed of an oil-resistant foam rubber.

It should be understood that hood 10 may be made of different materials as long as these are likely to resist the chemical environment of the wastewater to be treated. Suitable materials can be aluminum, stainless steel, plastic, pvc, epoxy coated fiberglass, aluminum, stainless steel and the like. A preferred material is epoxy-coated fiberglass, which can be properly molded to impart the desired shape to hood 10. Wall 30 may have different horizontal and vertical cross-sections with different inclinations.

Referring to FIG. 2, a typical below ground wastewater collector 18 includes a bottom 50 bridging spaced upstanding side walls 52 and 54. The catch basin 18 may have a top 56 having a drainage opening 58 for accessing the interior 60 of basin 18. In case of a catch basin water and debris would enter through a grating (not shown) over port 58.

Basin 18 is also adapted to receive an oil-water-floatable debris mixture through an inlet pipe 64. The inlet pipe 31 can be formed on any of the walls of the basin 18. In case of the basin 18 of FIG. 2, when rain occurs, oils accumulated over time on the parking lots, streets and on the roofs of buildings from air conditioning equipment and other machinery and mixed with water enter basin 18 as a mixture. The mixture passes through the basin's inlet 64 into the chamber 60 where the oil and floatable debris accumulate on top of the water.

Figure 4:
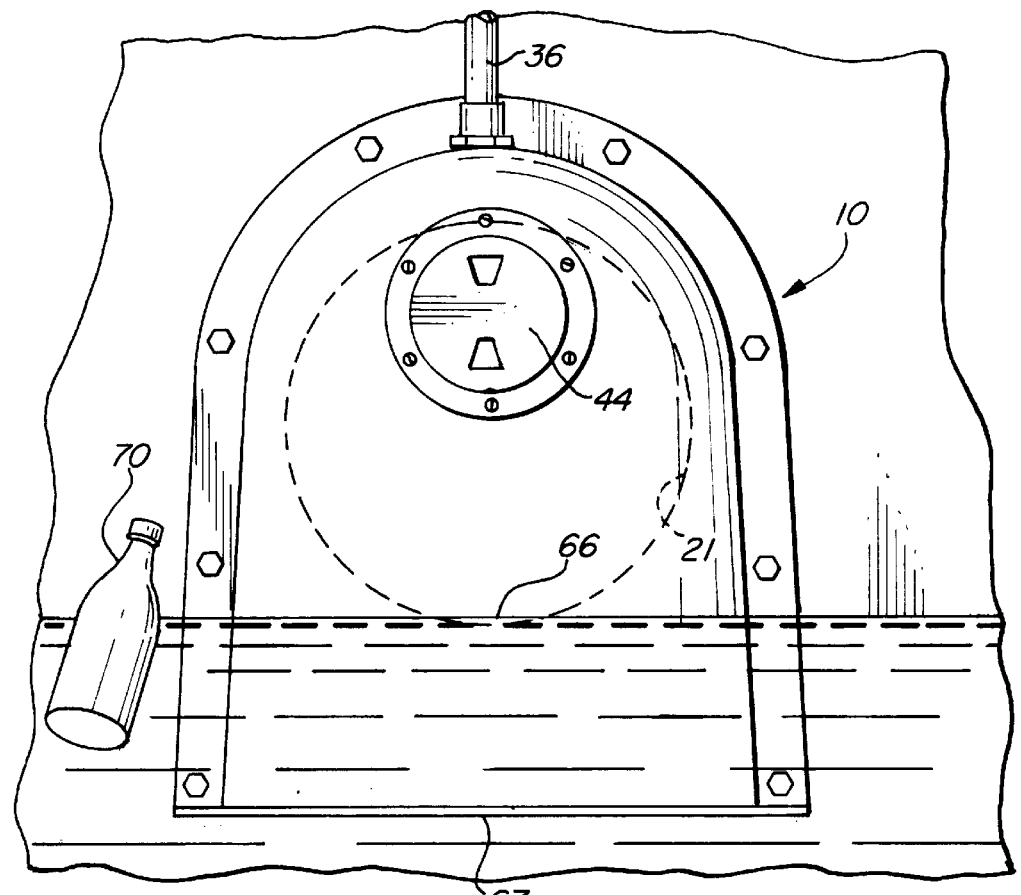
FIG. 4 is a front elevation view of the hood shown in FIG. 2.

In the embodiment illustrated in FIGS. 2, 3 and 4 the inlet and outlet pipes 21 and 64 are aligned and coaxial; however, they can be at different heights and there may not be any inlet pipe. Outlet pipe 21 may have a somewhat smaller transverse cross-section area than that of inlet pipe 64, so that when rain begins to fall, water tends to accumulate within basin 10.

Under normal conditions water accumulates in the basin to a static level 66 coinciding with respective lower segments of pipes 21 and 64 but above the bottom edge 67 where the intake to compartment 14 of hood 10 begins. Since oil in the incoming mixture accumulates on top of the water, the oil forms a supernatant layer reaching a level 68 above static level 66 at which the floatable debris 70 is also located.

When rainfall intensity rises, the flow of mixture into basin 18 also increases and the incoming water may reach a flood level 72 which is substantially higher than static level 66 of the water under normal conditions. However, oil and floatables are retained within basin 18.

In addition to liquids of different specific gravities and floatable debris, the incoming mixture introduces solid particles 72. These particles can be so-called gross particles with a specific gravity greater than the water's specific gravity and too large to be suspended in water, thus settling to the bottom of the basin 18 to form a sludge collection zone 74 and are retained there for periodic removal. In addition, solid particles can be so-called total suspended solids that are generally very fine particles which will settle down to the bottom given time or a slowdown of liquid flow. Experiments have shown that with the hood of the invention there is no observable re-suspension of these solid particles 72.

The barrier function of hood 10 to trap floatable debris and oil within basin 18 and prevent these from entering outlet pipe 30 is shown in FIGS. 1, 2, 3 and 4. The incoming mixture, which is delivered into basin 18 through inlet pipe 64, flows along a path indicated by arrows 76 toward outlet pipe 21. The natural buoyancy of oil droplets in the water forces them to the surface, where they accumulate, thus being effectively removed from the flow. The outgoing water is effectively filtered because it can access compartment 14 only from below the hood, as illustrated in FIGS. 2 and 3. Hood 10 extends downwardly toward bottom 50 of basin 18 and terminates below static level 66, thereby serving as a barrier to oil and debris accumulated in inlet chamber 60.

The nominal volume of the solids collection zone 60 is controlled by the distance between bottom 67 of hood 10 and the bottom 50 of basin 18. Based on empirical data, hood 10 can be particularly effective when its bottom 67 terminates below outlet pipe 21 at a distance equal to half the diameter of outlet pipe 21. This optimal position of the bottom entrance to the hood also provides an efficient flow of filtered water through outlet pipe 21. Vent 36 is sufficiently long so that its upper end terminates above flood level 72 in order to continue to equalize air pressure between inlet chamber 60 and outlet compartment 14.

Figure 5:
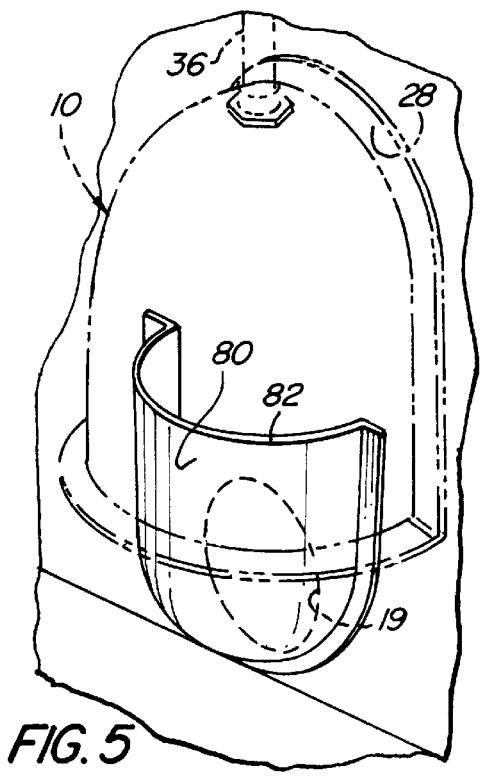
FIG. 5 is a perspective view of another embodiment of a hood in accordance with the invention.
Figure 6:
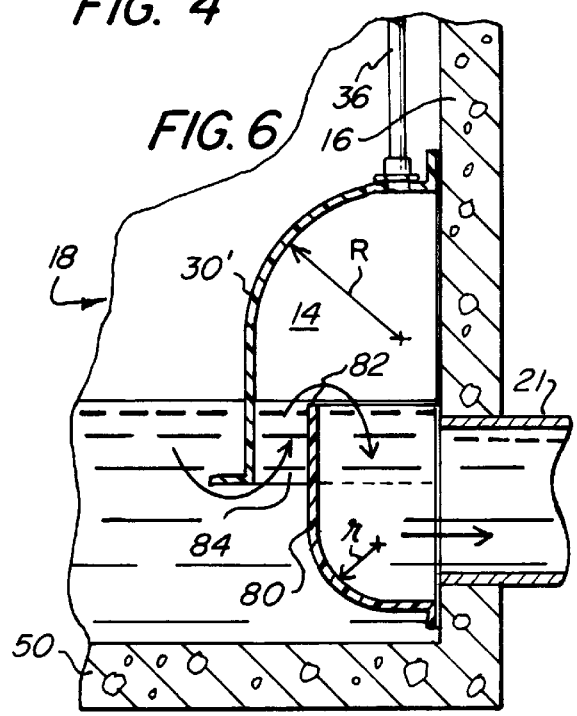
FIG. 6 is a side cross-sectional view of the embodiment shown in FIG. 5.

The embodiment shown in FIGS. 5 and 6 illustrate a hood 78 in accordance with the invention in conjunction with a weir 80 to accommodate a low location for outlet pipe 21. Since solids 74 entrained by incoming waste water tend to settle at the bottom of basin 18, the path through the hood 78 can become blocked, particularly when the outlet pipe 21 is located near the bottom 50 of basin 18. Weir 80 extends from a region below the pipe 21 to above the pipe 21 where the top edge 82 of weir 80 defines the water level within the basin 18. Weir 80 has a cross-section substantially smaller than that of hood 78 so that the hood 78 can mount over weir 80 as shown leaving a channel 84 between wall 30' of hood 78 and weir 80 for filtered water. Note that hood 78 is not located over outlet pipe 21 and that, therefore, no access port 42 is needed. The shapes of hood 78 and weir 80 can be the same. The weir 80 is sealably mounted to wall 16 of basin 18.

Figure 7:
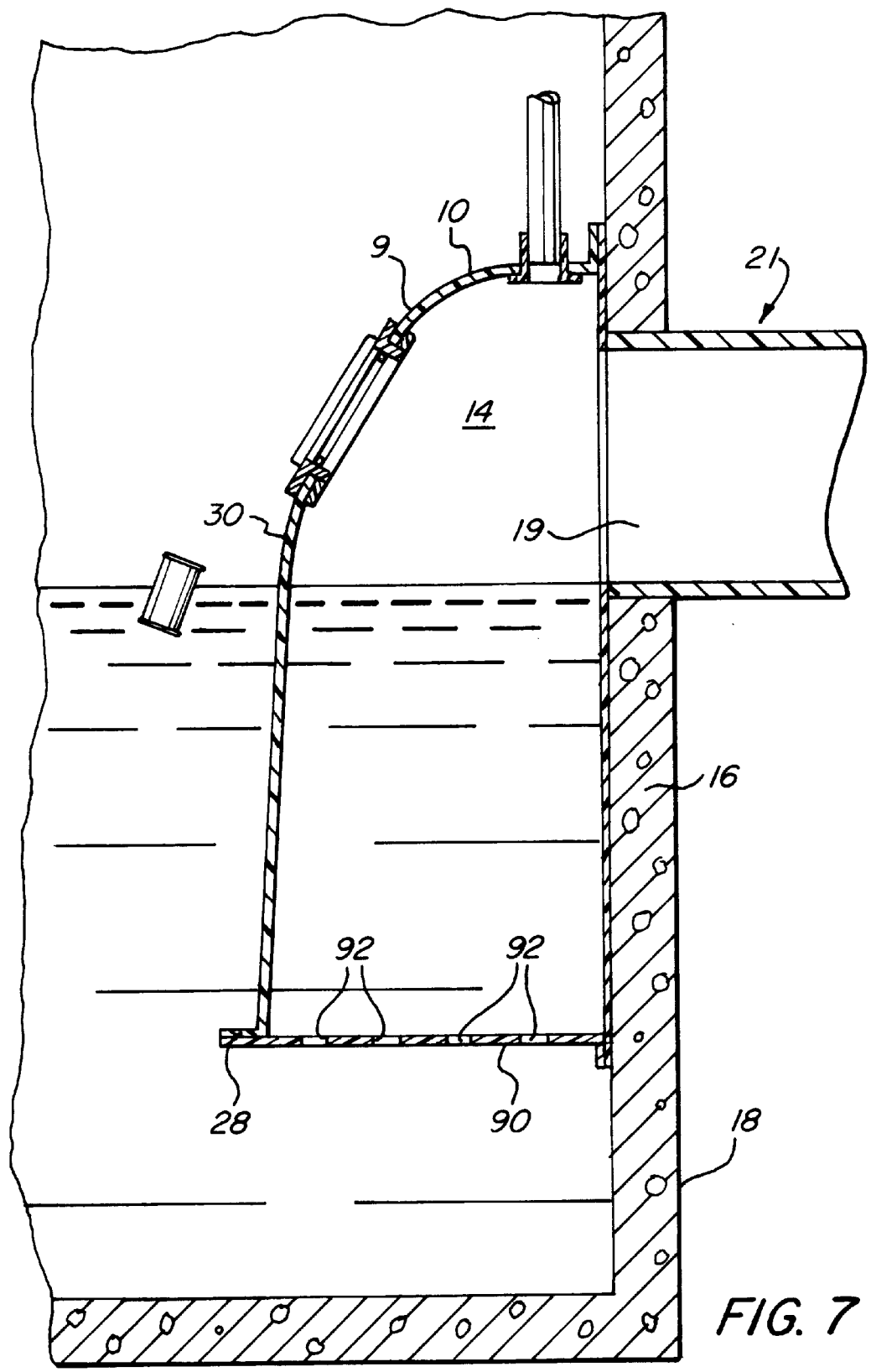
FIG. 7 is a side elevation sectional view of another embodiment for a hood according to the invention.

With a hood in accordance with the invention it becomes convenient to control the outflow of filtered water into the outlet pipe 21. Such control is desired to regulate the discharge of storm water into storm sewers at catch basin collection points throughout a geographic region. One technique for controlling the wastewater flow through hood 10 is as shown in FIG. 7 with the use of a flow restrictor in the form of an apertured plate 90 at the bottom of hood 10. The plate 90 is bolted to the bottom edge 28 of hood 10 with suitable fasteners, not shown. Hence, upon installation of the hood to wall 16 of basin 18 access to the interior compartment 14 of hood 10 is determined by the size and number of apertures 92. The apertures or perforations 92 formed in plate 90 are so sized that during a heavy rain storm, the flow of the liquid through outlet 19 of basin 18 is maintained relatively even, to thus prevent flooding downstream from basin 18.

FIGS. 8 through 10 illustrate another embodiment for a flow restrictor 96 according to the invention. This includes a hollow standpipe 98 mounted inside hood 100 in alignment with an access port 99 on a bottom plate 102 across the bottom of hood 100. The standpipe 98 has a plurality of peripheral orifices 104.1–104-6, which have different sizes select to differently restrict the flow of outgoing water. Preferably the diameters of the orifices increases towards the top of standpipe 98, as shown in FIG. 9. This differentially regulates the outflow of water depending upon the drainage demanded by the rain storm.

The standpipe is advantageously formed with a diameter of up to about one half (½) of the diameter of the outlet pipe 21 The standpipe 98 is mounted on bottom plate 102 which closes the interior 14 of hood 10. The wall 30 of hood 10 can be extended down to plate 102 or a skirt 106 is attached to the bottom of hood 10 with bolts.

The embodiment shown in FIGS. 11 and 12 illustrates a pressure-equalization vent having a vent pipe 108 whose end segment 112 is bent back as shown and has a perforated bottom 134 and laterally formed openings 136. As has been mentioned before, under normal conditions a mixture entering a catch basin usually reaches a static level 113. The vent pipe 108 is made sufficiently long so that its end segment 112 is above the static level 113 and a liquid normally cannot enter the vent pipe 108. However, as a result of heavy rains, the incoming mixture may reach a flood level 116 (FIG. 12) and, upon entering a compartment 114 through the perforated bottom 134 of the end segment 112, would leak directly through the vent pipe 108 into the air compartment enclosed by hood 10 as shown in FIG. 1.

In order to avoid this undesirable liquid leak, a float valve 117 is placed inside a compartment 114 formed in the end segment 112. The end segment 112, therefore, is terminated with an enlarged end portion whose inner diameter is greater than the diameter of the vent pipe 108. Hence, the vent has an outwardly flared collar 118 to form a valve seat 119. The flared collar 118 connects the enlarged end segment 112 to pipe vent 108. When liquid rises as shown in FIG. 12, the float valve 117 is pressed against valve seat 119 to prevent liquid from passing through vent 108.

FIG. 13 illustrates another embodiment of a float valve assembly 128 including a flapper 132 which is pivotally mounted to a flange 134 at the end of vent pipe 110 by means of a hinge 136. The assembly 128 further has a float ball 138 on the flapper 132, opposite to hinge 136. Under normal conditions corresponding to a static level of liquid accumulated in a catch basin (not shown) the flapper 132 is in a lower position as shown in phantom lines. However, when the liquid rises to a flood level 140, the flapper valve swings upwardly in a direction of arrow 142 so as to cause flapper 132 to close the outlet of flange 134 to prevent liquid from entering pipe 110.

While the invention has been disclosed in its preferred form, it is to be understood that the specific embodiment, as described and illustrated herein, is not to be considered in a limited sense, as there may be other forms or modifications of the invention which should also be construed to come with the scope of the appended claims.

What is claimed is:

1. An apparatus for mounting around an outlet of a waste water basin which receives a waste water mixture with a variety of waste materials such as a first liquid having a first specific gravity that is lower than that of water so as to float on the water and with solids suspended in the waste water mixture and debris floating on the mixture, comprising:

a hood extending along an axis, and having a wall shaped to partially sealingly fit around the outlet of an interior wall of the waste water basin so as to define at least a partially sealable compartment therewith that is open to the outlet and extends below the outlet so that waste materials floating on said water mixture outside of the compartment are prevented from entering said outlet;

a vent mounted on the wall of said hood and extending upwardly therefrom, the vent opening into the compartment to provide air communication with the compartment upon mounting of the hood to the interior wall of the waste water basin to inhibit siphoning of said water mixture from inside said waste water basin through said compartment into said outlet; and wherein the hood has a mounting flange located to at least partially surround the compartment around the outlet.

2. The apparatus as defined in claim 1 wherein mounting flange is shaped to enable the hood to be sealingly affixed to the interior wall of the waste water basin around the outlet.

3. The apparatus as claimed in claim 1 and further comprising:

a weir for mounting in front of the outlet of the waste water basin, the cross-section of the weir being substantially smaller than that of the hood so as to fit within the compartment formed by the hood with the wall of the basin and having a shape adapted to be spaced from and at least partially cover the outlet in sealing relationship with the wall of said basin while forming a discharge channel between the weir and the hood; so that when said hood is mounted in overlapping relationship with said weir to the wall of the basin, said discharge channel enables filtered water to be discharged through the compartment over the weir to the outlet of the waste water basin.

4. The apparatus as defined in claim 3 wherein the shape of the weir is similar to that of the hood and wherein the weir has a peripheral wall shaped to form a second sealable compartment facing upwardly when the weir is mounted to the interior wall of the waste water basin over the outlet, said weir further having a mounting flange shaped to fit flush with the interior wall of the basin for mounting thereto.

5. An apparatus for mounting to a waste water basin which receives a waste water mixture with a variety of waste materials such as a first liquid having a specific gravity that is lower than that of water so as to float on the water with solids suspended in the waste water mixture and debris floating on the waste water mixture, comprising:

a hood extending along an axis and having a wall shaped to sealingly fit with an interior wall of the waste water basin so as to define a compartment therewith; the hood having a mounting flange located around the compartment, said flange being shaped to enable the flange to be sealingly affixed to an interior wall of the waste water basin so as to define a compartment therewith; and a vent mounted on the wall and extending upwardly therefrom, the vent opening into the compartment to provide air communication with the compartment upon mounting of the hood to the interior wall of the waste water basin wherein the flange further being formed of:

a pair of axially extending and spaced apart side flange segments which are aligned and have lower and upper ends, a bottom portion extending horizontally outwardly from and bridging the lower ends of the side flange segments, and an upper portion connecting upper ends of the side flange segments, said side flange segments and said upper portion extending in the same vertical plane, said wall having a dome shape and having an axial cross-section including at least one axial portion extending angularly toward the upper portion of the mounting flange.

6. An apparatus for mounting around an outlet of a waste water basin which receives a waste water mixture with a variety of waste materials such as a first liquid having a first specific gravity that is lower than that of water so as to float on the water and with solids suspended in and debris floating on the waste water mixture, comprising:

a hood extending along an axis, and having a wall shaped to sealingly fit with an interior wall of the waste water basin so as to define a partially sealable compartment therewith around the outlet with an opening to permit the flow of water from below said outlet when it is partially surrounded by the wall; and a vent mounted on the wall and extending upwardly therefrom, the vent opening into the compartment to provide air communication with the compartment upon mounting of the hood to the interior wall of the waste water basin and wherein:

the hood has a removable port mounted thereon for access to the compartment and to an outlet of the waste water basin that is covered by the hood when it is mounted to the interior wall of the waste water basin.

7. The apparatus as defined in claim 6 wherein the vent is a pipe and the upper end of the vent pipe has a floatable element and a valve seat for seating the floatable element and located so as to prevent the first liquid from entering the sealable compartment through the vent pipe when the first liquid rises in the waste water basin to move the floatable element to seal the vent pipe.

8. The apparatus as defined in claim 7 wherein the upper end of the pipe has an end portion with a valve seat and a perforated end, and wherein the floatable element is placed inside the end portion, which is sized to enable the floatable element to freely float between the perforated end and the valve seat to prevent the first liquid from entering the vent pipe when the first liquid rises in the waste water basin above the perforated end.

9. The apparatus as defined in claim 7 wherein the upper end of the vent pipe terminates at said valve seat and wherein the floatable element includes a flapper pivotally mounted to the pipe at the valve seat so as to pivot between an open position and a closed position of the floatable element, and wherein the floatable element further includes a valve element mounted to the flapper to seal the vent pipe when the first liquid rises in the waste water basin.

10. An apparatus for mounting around an outlet of a waste water basin which receives a waste water mixture with a variety of waste materials such as a first liquid having a specific gravity so as to float on the water, solids suspended in the waste water mixture and debris floating on the mixture, for separating water from the first liquid and from the floatable debris, comprising:

a hood extending along an axis, and having a wall shaped to sealingly fit with an interior wall around the outlet of the waste water basin so as to define a compartment around the outlet that inhibits passage of waste materials to the outlet from the basin; and a vent mounted to the hood and extending upwardly therefrom, the vent opening into the sealable compartment to provide air communication with the sealable compartment upon mounting of the hood to the interior wall of the waste wall basin;

said hood having a water flow restrictor mounted thereto, said flow restrictor having a passageway located and sized to enable water from the basin to pass to the outlet while limiting the flow of water into the sealable compartment from the waste water basin and thus enable source point control over the entry of contaminating materials into a sewer system during high water flow conditions; and wherein the hood has a mounting flange located to at least partially surround the compartment around the outlet.

11. The apparatus as defined in claim 10 wherein said flow restrictor comprises an elongated hollow pipe mounted within said hood on said wall and having an opening into said basin, said pipe having an orifice opening into said compartment so as to enable water flow to said compartment for water rising in said hollow pipe through its opening with control over the discharge of water from said basin into said outlet.

12. The hood as defined in claim 10 wherein said flow restrictor comprises an apertured plate.

13. The hood as defined in claim 10 wherein the flow restrictor comprises:

a support mounted to the hood and having an opening; and an elongated hollow pipe mounted on said support in alignment with its opening and extending into said compartment, said pipe having a plurality of peripheral orifices opening into said compartment so as to provide increased total water flow to said compartment by water rising in said hollow pipe for enhanced control over the discharge of water from said basin into said outlet.

14. The apparatus as defined in claim 13 wherein said orifices are axially spaced and gradually increase in size toward a top of said pipe.

15. A liquid pollutant-separating system for a waste water mixture with a variety of waste materials such as a first liquid having a specific gravity so as to float on water and with solids suspended in the waste water mixture and debris floating on the mixture, the liquid pollutant-separating system comprising:

a waste water basin receiving a waste water mixture and having an interior wall and an outlet formed in the interior wall for discharging water;

a hood having a wall shaped to sealingly fit with the interior wall of the waste water basin so as to define a compartment therewith having an opening leading into said basin with said wall sized to locate said opening effectively below the outlet; and a vent mounted on the wall of the hood and extending upwardly therefrom, the vent opening into the compartment to provide air communication with the compartment upon mounting of the hood to the interior wall of the waste water basin so as to inhibit siphoning action from said outlet causing a drawing of waste water from the basin; and wherein the hood has a mounting flange located to at least partially surround the compartment around the outlet and wherein the hood has a removable port mounted thereon for access to the compartment and to the outlet of the waste water basin that is covered by the hood when it is mounted to the interior wall of the waste water basin.

16. The liquid pollutant-separating system as defined in claim 15 wherein the hood has a gasket mounted between the flange and the interior wall of the waste water basin.

17. The liquid pollutant-separating system as defined in claim 15 wherein the hood has a mounting flange located around the compartment, the flange being shaped to enable the hood to be sealingly affixed to the interior wall.

18. The liquid pollutant-separating system as defined in claim 15 and further comprising a weir for mounting in front of the outlet of the waste water basin and sealingly affixed to said wall of the basin with the hood being in overlapping relationship with said weir, the cross-section of the weir being substantially smaller than that of the hood; so that a discharge channel is formed between the hood and the weir through which water is discharged over the weir to the outlet of the waste water basin.

19. The liquid pollutant-separating system as defined in claim 18 wherein the shape of the weir is similar to that of the hood and wherein the weir has a peripheral wall shaped to form a second upwardly open compartment with the interior wall of the waste water basin over the outlet, said weir further having a mounting flange shaped to fit flush with the interior wall of the waste water basin for mounting thereto.

20. The liquid-pollutant separating system as defined in claim 15 and further comprising:

a support mounted to the hood so as to form a compartment between the hood and the wall, said support having an opening; and an elongated hollow pipe mounted on the support in alignment with its opening and extending into the compartment formed by the hood and the wall, the elongated hollow pipe having a plurality of spaced apart orifices opening into said compartment and gradually increasing in size toward a top of the pipe.

* * * * *